UNITED STATES PATENT OFFICE.

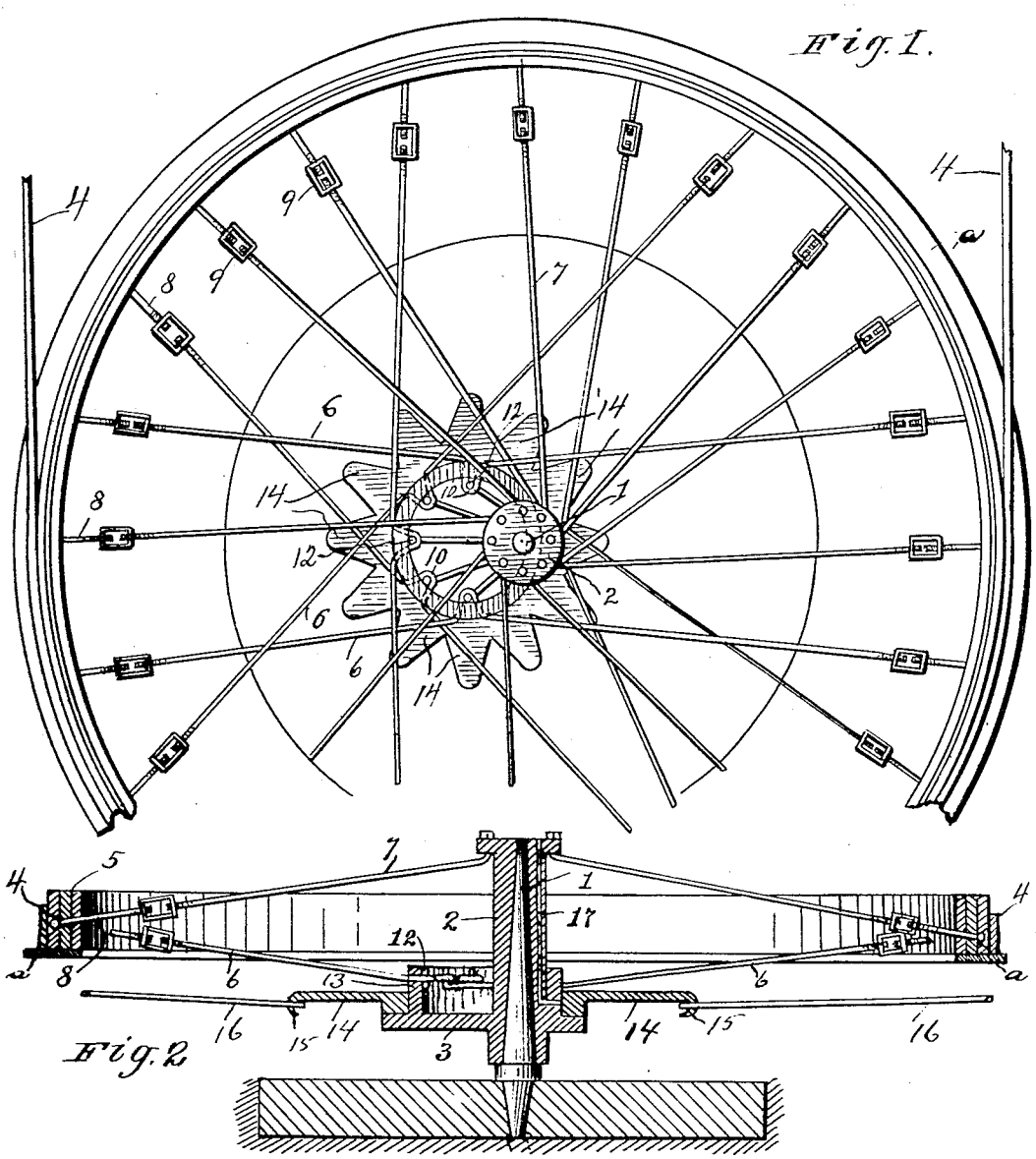

DANIEL R. BLAKESLEE, OF VANBUREN, INDIANA.

OIL-WELL-PUMPING MECHANISM.

No. 892,354.　　　　Specification of Letters Patent.　　　Patented June 30, 1908.

Original application filed June 16, 1906, Serial No. 322,096. Divided and this application filed March 11, 1907.
Serial No. 361,801.

*To all whom it may concern:*

Be it known that I, DANIEL R. BLAKESLEE, a citizen of the United States of America, residing at Vanburen, in the county of Grant and State of Indiana, have invented certain new and useful Improvements in Oil-Well-Pumping Mechanism, of which the following is a specification.

This invention relates to new and useful improvements in the oil well pumping mechanism, as set forth in application Serial No. 322,096 filed June 16, 1906, and has relation more particularly to the wheel employed therein.

The invention has for its object to provide novel means whereby the rim of the wheel is secured to the hub in such a manner that the rim in its rotation will exert on the hub both a push and a pull.

It is also an object of this invention to provide a device which will prove simple in construction, efficient in practice and economical to manufacture.

With the above and other objects in view, the invention consists in the details of construction and in the arrangement and combination of parts to be hereinafter more fully set forth and claimed.

In describing the invention in detail reference will be had to the accompanying drawings forming part of this specification in which like characters denote corresponding parts in the several views and in which—

Figure 1, is a fragmentary view illustrating the wheel in top plan. Fig. 2, is a central section. Fig. 3, is a detail view showing the means whereby the spokes are secured to the hub.

Mounted on a suitably positioned shaft 1, is a hub 2, which may be of any ordinary construction, but is shown in the drawings as in the co-pending application of which this is a division.

Formed with the hub is the eccentric 3. The eccentric is operated by means of a belt 4, passing around the rim 5, which is connected to the hub by the spokes 6 and 7. This rim may be of any required circumference and is formed of a series of overlapping bent strips of wood, preferably of three thicknesses. The lower edge of the rim is provided with an outstanding flange *a* which is for the purpose of preventing the belt passing therearound from slipping off. The rim is provided with a series of apertures through which project the headed spoke sections 8, having their free portions threaded, the outer ends of the openings of the rim being countersunk so that the tops of the heads of the spoke sections will be flush with the periphery of the rim when in applied position. Secured to the spoke sections are turn buckles 9, which in turn engage the threaded ends of the spokes 6, and 7. The spokes 6, are secured to the eccentric 3, tangentially of the periphery thereof. It is to be noted that the spokes before they are connected to the eccentric cross each other. By this arrangement, as is thought obvious, a push and pull will be exerted on the eccentric by the rotation of the wheel. The spokes 6, extend entirely across the interior of the rim and are provided with approximately V-shaped offsets 10, which pass through the openings 11, of the eccentric and are engaged by the keys 12 which hold said spokes in engagement with the eccentric.

The spokes 7, are secured to the upper end of the hub 2, as is plainly shown in the drawings.

The eccentric is provided with a flange 13, arranged adjacent the edge thereof. Embracing this flange 13, and resting on the eccentric is a star wheel 14, which has depending from its points, the hooks 15. To these hooks 15, are fastened the ends of the pull rods 16, which in the present instance are intended to operate oil well pumps. It is to be stated that this structure, however, forms no part of the present invention.

I also provide the hub 2, with a duct 17, through which oil may be fed to the bearings of the working parts of the device.

Having thus described my invention, what I claim as new and wish to secure by Letters Patent, is—

1. In combination a wheel comprising a hub having a continuous flange, a rim, and spokes connecting said flange and rim, said spokes extending entirely across the wheel tangentially of the flange, and means carried by the spokes for exerting a pressure on the inner surface of the flange.

2. In combination, a wheel comprising a hub having a continuous flange, said flange being perforated, a rim, spokes connecting said flange and rim, said spokes extending entirely across the wheel tangentially of the flange and having offsets protruding through the perforations of the flange, and means engaging the offsets acting in conjunction with the flange for exerting a pressure on the inner surface of the flange.

3. In combination, a wheel comprising a hub having a continuous flange, said flange being perforated, a rim, spokes connecting said flange and rim, said spokes extending entirely across the wheel tangentially of the flange and having offsets protruding through the perforations of the flange, keys extending through the offsets bearing against the inner surface of the flange to exert pressure thereon.

In testimony whereof I affix my signature in the presence of two witnesses, this 8th day of March, 1907.

DANIEL R. BLAKESLEE.

Witnesses:
HERBERT M. ELLIOTT,
WILLIAM H. BOBBITT.